Feb. 9, 1926.
A. T. HINCKLEY
1,572,534
SECTIONAL ELECTRODE WITH LOCKED SCREW THREAD JOINT
Filed Oct. 27, 1923
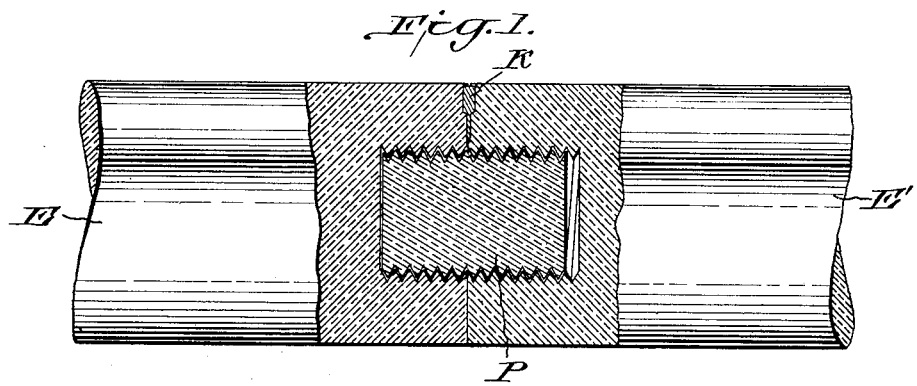
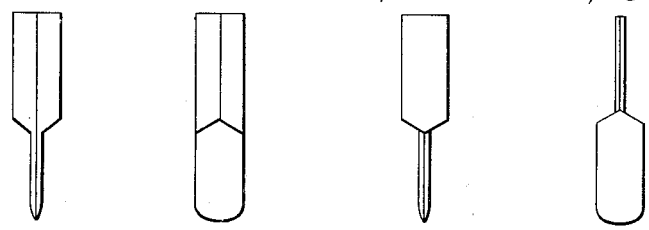
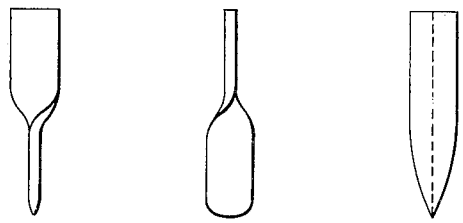
Inventor:
Arthur T. Hinckley,
Attorneys.

Patented Feb. 9, 1926.

1,572,534

UNITED STATES PATENT OFFICE.

ARTHUR T. HINCKLEY, OF NIAGARA FALLS, NEW YORK, ASSIGNOR TO NATIONAL CARBON COMPANY, INC., A CORPORATION OF NEW YORK.

SECTIONAL ELECTRODE WITH LOCKED SCREW-THREAD JOINT.

Application filed October 27, 1923. Serial No. 671,158.

*To all whom it may concern:*

Be it known that I, ARTHUR T. HINCKLEY, a citizen of the United States, residing at Niagara Falls, in the county of Niagara and State of New York, have invented certain new and useful Improvements in Sectional Electrodes with Locked Screw-Thread Joints, of which the following is a specification.

The invention relates to sectional electrodes of carbon (including more or less completely graphitized material) in which the electrode sections are held together by screw-thread joints. The novelty of the invention resides in the provision of means whereby the joint is positively locked to prevent relative movement of its parts, so that the joint can not become loosened. Its conductivity is thereby preserved and breakage at the joint is prevented.

A threaded joint between electrode sections may be made by cutting an end of one section to a reduced diameter and threading the reduced portion, forming a cavity of corresponding size in the end of another section and cutting a female thread on the walls of the cavity, and then screwing the parts together. More frequently both the sections to be joined are provided with threaded cavities and a separate threaded pin or dowel is used, the pin being of such length that the sections may be screwed onto its ends until they abut and enclose the pin completely.

A joint of this latter type using a separate threaded pin is shown in section in Fig. 1 of the accompanying drawing, the joint as illustrated being provided with locking means in accordance with my invention. Figs. 2 and 2ª are front and side views of one form of locking member; Figs. 3 and 3ª are similar views of a modified locking member; Figs. 4 and 4ª show another modification; and Figs. 5 and 5ª are respectively side and end views of still another form of locking device.

Conductive cements have been used heretofore in connection with threaded electrode joints. These cements are used primarily to fill up all cavities between adjacent surfaces. Such cements do not suffice to prevent unscrewing of the joints by vibration. It will be noted that there is a large expanse of surfaces still in contact after the joint is slightly loosened, and prior to my invention it was not realized that even a slight loosening of the joint is highly objectionable.

Electrodes are frequently subjected to transverse stresses, especially when used in tilting furnaces, and these stresses sometimes cause them to break at the joints. Such breakage occasions expensive delays and loss and spoilage of valuable material. While my invention serves to keep the conductivity of the joints at the desirable high value, I regard its principal merit as residing in the avoidance of broken electrodes. This advantageous result is brought about by preventing even the slightest loosening of the joints.

In Fig. 1, E and E' are the electrode sections. P is the threaded pin onto which they are screwed, and K is a locking member or key which prevents relative movement between the sections S and S'. It will be apparent that when the electrode is in a horizontal position supported at both ends, the stresses set up by its weight are compressive above a certain plane and tensile below this plane. It is the tensile stress which ultimately breaks the electrode, as its material is better adapted to resist compression than tension.

If the sections are in actual contact, most of the pin is under tension and the stress per unit area is relatively low. If, however, the sections are barely separated, the neutral plane is considerably lowered and the tension is all localized in the lower half of the pin. When the tension is thus localized in a relatively small area, which is relatively close to the neutral plane of stresses, the tension per unit area is obviously greatly increased and the pin becomes much more liable to breakage. If the electrode is supported at such points that it acts as a cantilever beam, the stresses are of course reversed, but the same advantage is obtained by keeping the sections in contact.

Vibration and shocks produced by tilting the furnace, by regulation of the electrode position during operation of the furnace, by pressure of the furnace charge against the side of the electrode while charging the furnace or during operation and even by the arc itself, tend strongly to loosen threaded electrode joints, even when they have been screwed up as tightly as possible. I provide mechanical means, preferably in the form of a key-like implement, to prevent any loosening of the joint even when the latter is subjected to severe and continuous vibration.

Such implement may take a variety of forms. Figs. 2 and 2ª show a form made by cutting one end of a piece of square bar stock to a thin blade which is preferably brought to a sharp point or edge at its end. The blade portion of this implement is first forced into the joint and then the larger end is also driven in. The electrode material will be cut away by the advancing edges of the large end and when the implement is in its final position it will lie in opposed cavities in the two sections, rendering relative rotation impossible. The implement is preferably driven until it is flush with the electrode surface so that it will not interfere with the gland on the furnace as the electrode is fed through the gland.

The modification shown in Figs. 3 and 3ª is similar to that just described except that both ends are blades, arranged perpendicularly. Figs. 4 and 4ª show a similar form made by twisting one end of a strip of sheet metal through a 90° angle while holding the other end stationary. Figs. 5 and 5ª show a modification which has no blade portion but is tapered to a point to permit it to be driven into the joint. The implement should be made of such material, usually metal, that the furnace charge will not be contaminated by it.

While several modifications of the locking implement have been illustrated, it is apparent that a great number of other forms might be used, and I do not restrict myself except as required by the claims.

I claim:

1. An electrode comprising sections joined by screw threads, and a member projecting into cavities in adjacent electrode sections and locking them against relative rotation.

2. The invention according to claim 1 in which the cavities in the adjacent electrode sections are at opposite points on surfaces perpendicular to the electrode axis.

3. An electrode comprising sections joined by screw threads and a member projecting into cavities in adjacent electrode sections and locking them against relative rotation, said member being pointed or edged to facilitate its insertion.

4. A section electrode having screw-thread joints positively locked to prevent loosening.

In testimony whereof, I affix my signature.

ARTHUR T. HINCKLEY.